United States Patent
Braeutigam

(10) Patent No.: US 9,499,276 B2
(45) Date of Patent: Nov. 22, 2016

(54) HELICOPTER WITH ENGINE AIR INTAKES

(71) Applicant: AIRBUS HELICOPTERS DEUTSCHLAND GMBH, Donauworth (DE)

(72) Inventor: Ralf Braeutigam, Tapfheim (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 0 days.

(21) Appl. No.: 14/496,378

(22) Filed: Sep. 25, 2014

(65) Prior Publication Data

US 2015/0090844 A1 Apr. 2, 2015

(30) Foreign Application Priority Data

Sep. 30, 2013 (EP) .................................. 13400021

(51) Int. Cl.
  *B64D 33/02* (2006.01)
  *B64D 27/02* (2006.01)
  *B64C 27/04* (2006.01)

(52) U.S. Cl.
  CPC .............. *B64D 33/02* (2013.01); *B64D 27/02* (2013.01); *B64C 27/04* (2013.01); *B64D 2033/0253* (2013.01)

(58) Field of Classification Search
  CPC .................... B64D 33/02; B64D 33/00; B64D 27/20; B64D 27/14; B64C 27/12; F16K 11/052
  USPC .................................... 137/625.44; 244/53 B
  See application file for complete search history.

(56) References Cited

U.S. PATENT DOCUMENTS

| 3,998,048 A | 12/1976 | Derue |
| 5,662,292 A | 9/1997 | Greene et al. |
| 7,634,984 B2 * | 12/2009 | Stelzer ............... B01D 46/0005 123/198 E |
| 2008/0173768 A1 * | 7/2008 | Chaniot .................. B64C 27/14 244/53 B |

(Continued)

FOREIGN PATENT DOCUMENTS

| CN | 101062717 A | 10/2007 | |
| IT | EP 2133265 A1 * | 12/2009 | ............... B64D 7/08 |

OTHER PUBLICATIONS

Extended European Search Report for EP 13400021.5, Completed by the European Patent Office, Dated Mar. 11, 2014, 7 Pages.

(Continued)

*Primary Examiner* — Brian M O'Hara
*Assistant Examiner* — Assres H Woldemaryam
(74) *Attorney, Agent, or Firm* — Brooks Kushman P.C.

(57) ABSTRACT

A helicopter with a fuselage, at least two engines substantially inside said fuselage, an air intake for each of said two engines and at least two separate lateral air inlet ports for said at least two engines in said fuselage. Said separate lateral air inlet ports being arranged on sides opposed to each other relative to an essentially vertical midplane of said fuselage and oriented with their respective cross section substantially parallel to a forward flight direction of the helicopter. At least one frontal air inlet port with a forward portion is provided separate from said lateral air inlet ports, said frontal air inlet port being located on a gear cowling of the fuselage oriented with its cross section substantially perpendicular to the forward flight direction of the helicopter.

15 Claims, 4 Drawing Sheets

(56) References Cited

U.S. PATENT DOCUMENTS

| | | | | |
|---|---|---|---|---|
| 2009/0007528 A1* | 1/2009 | Wilson | ............... | B01D 46/002 55/306 |
| 2009/0261208 A1* | 10/2009 | Belyew | ............... | B01D 46/10 244/53 B |
| 2010/0065139 A1* | 3/2010 | Osswald | ............... | F02C 7/052 137/625.44 |
| 2011/0001003 A1* | 1/2011 | Krahl | ............... | B01D 46/0035 244/58 |
| 2013/0092798 A1* | 4/2013 | Boyce | ............... | B01D 46/103 244/53 B |
| 2014/0158833 A1 | 6/2014 | Braeutigam | | |

OTHER PUBLICATIONS

Chinese Office Action and English translation for corresponding Application No. 201410667621.5, mailed Jan. 5, 2016, 8 pages.

* cited by examiner

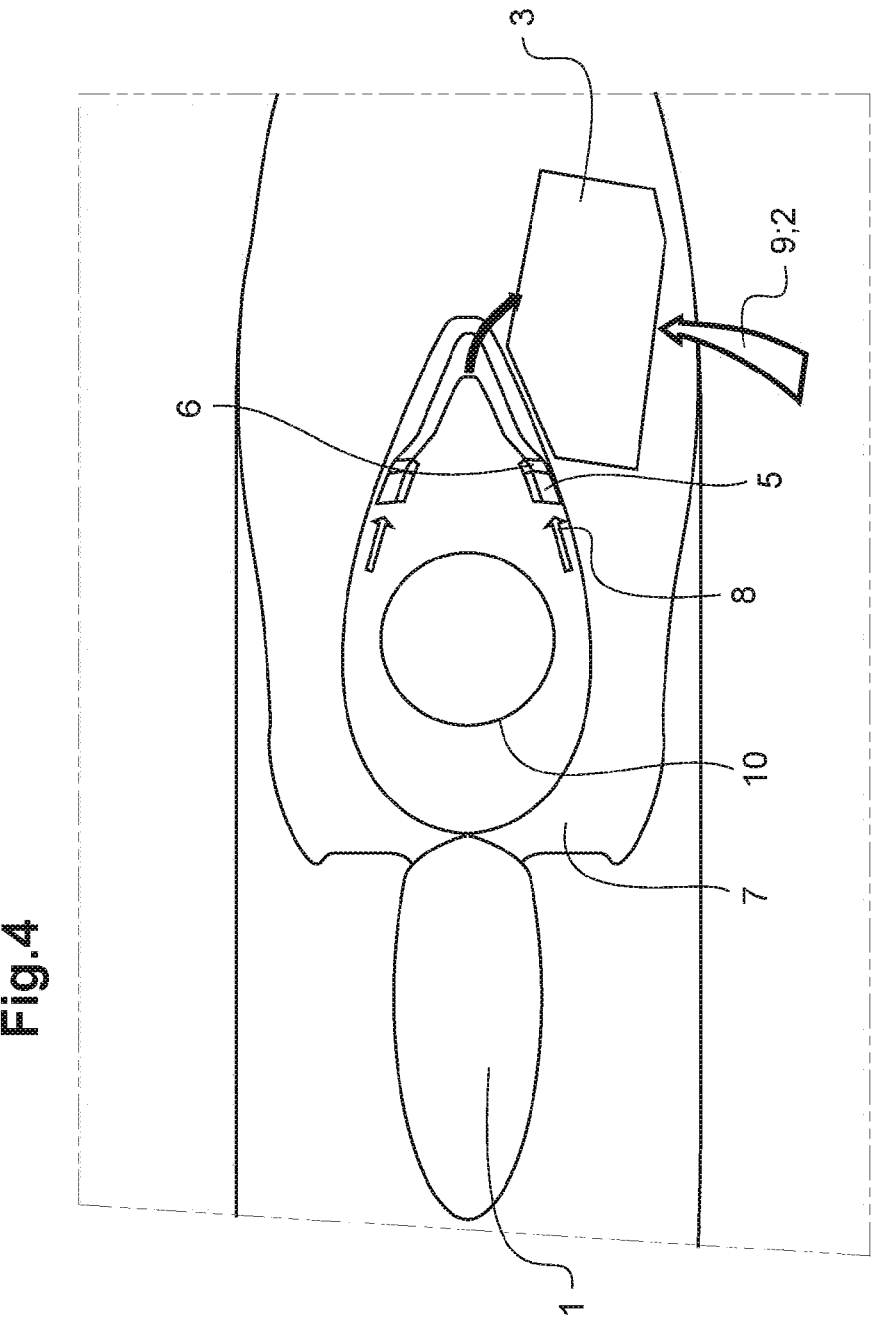

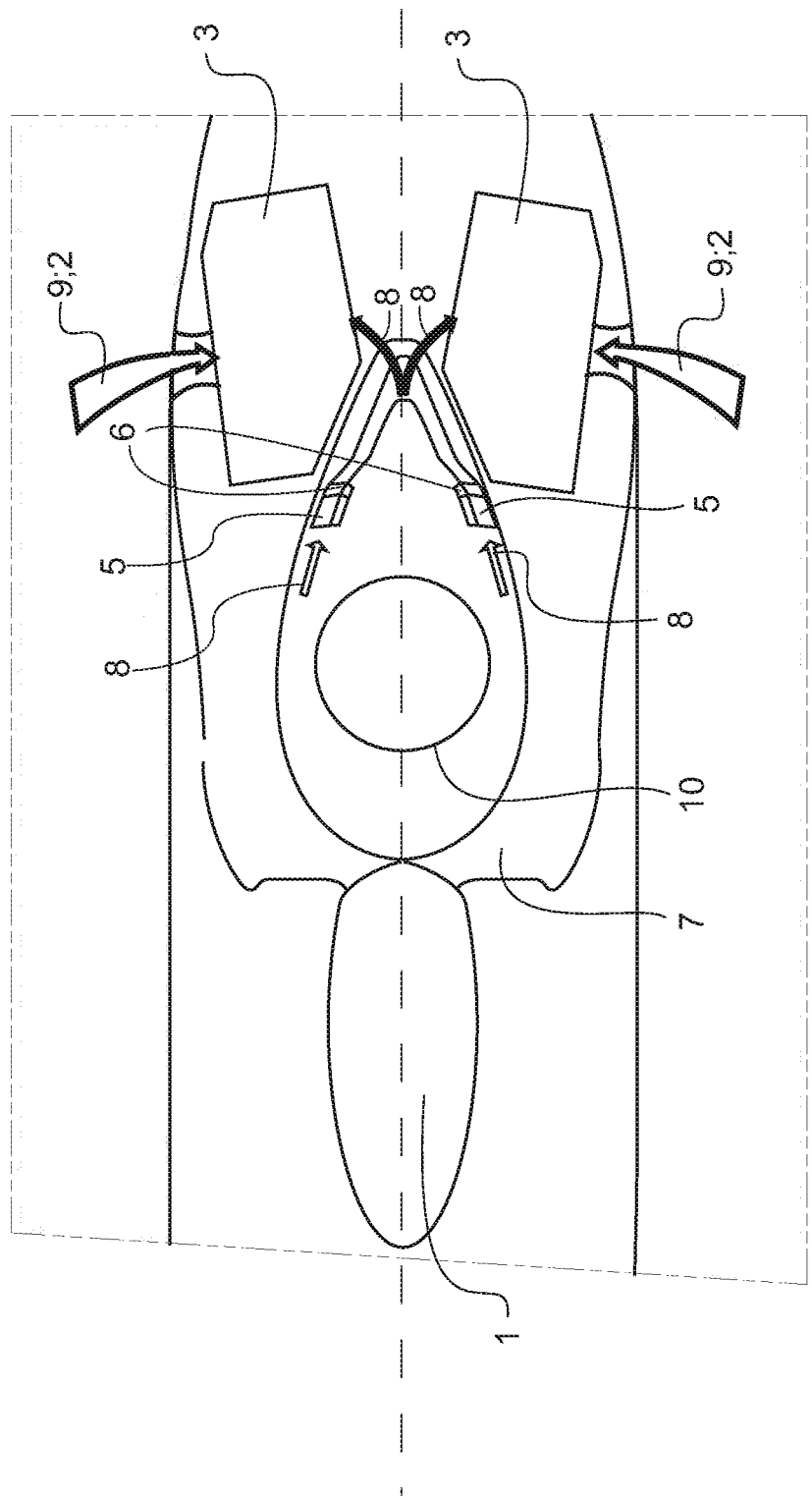

HELICOPTER WITH ENGINE AIR INTAKES

CROSS REFERENCE TO RELATED APPLICATION

This application claims priority to European patent application No. EP 13 400021.5 filed on Sep. 30, 2013, the disclosure of which is incorporated in its entirety by reference herein.

BACKGROUND OF THE INVENTION (1) Field of the Invention

The invention is related to helicopters with engine air intakes, particularly to helicopters with radial engine air intakes with the features of the preamble of claim 1.

(2) Description of Related Art

Helicopters (HC) with lateral engine air inlet ports suck in the engine air from the side. In forward flight conditions of HC there will be air pressure losses with lateral engine air inlet ports, while for hover operations said lateral inlet ports are suitable. A ram-air intake is any intake design which uses the dynamic air pressure—so called RAM effect—created by vehicle motion to increase the static air pressure inside of the intake manifold on an engine, thus allowing a greater mass flow through the engine and hence increasing engine power.

The document US 2010/065139 A1 discloses a device for feeding combustion air to an engine disposed in an interior of an aircraft with an air inlet duct extending between an exterior surface of the aircraft and the engine, wherein the air inlet duct extends from air inlets disposed in a first region of the exterior surface; at least one further air inlet duct extending between a second region of the exterior surface and the engine, so as to provide a two-way airstream supply; and a control device configured to switch the air supply to the engine to the at least one further air inlet duct when a blockage occurs in the air inlets.

The document U.S. Pat. No. 5,662,292 A discloses a specially contoured barrier type filter disposed in front of a helicopter turbine inlet for maximized airflow during forward, as well as sideways flight. The contouring additionally reduces the tendency of the filter to clog. A bypass mechanism is provided should the pressure differential across the filter exceed a predetermined value. The bypass configuration achieves a limited particle separation function in order to provide residual protection. An air box attached to the inlet is formed to provide low distortion levels in the airflow entering the engine inlet.

BRIEF SUMMARY OF THE INVENTION

It is an object of the invention to provide a helicopter with improved engine air supply for fast forward flight conditions.

The solution is provided with a helicopter with engine air intakes with the features of claim 1 of the invention. Preferred embodiments of the invention are provided with the subclaims.

According to the invention a helicopter is provided with a fuselage, at least two engines substantially inside said fuselage, an air intake for each of said two engines and at least two separate lateral air inlet ports for said at least two engines in said fuselage. Said separate lateral air inlet ports are arranged on sides opposed to each other relative to an essentially vertical midplane of said fuselage and oriented with their respective cross section substantially parallel to a forward flight direction of the helicopter.

Further, at least one frontal air inlet port with a forward portion is provided separate from said lateral air inlet ports, said frontal air inlet port being located on a gear cowling of the fuselage and being oriented with its cross section substantially perpendicular to the forward flight direction of the helicopter. A straight path for airflow through the frontal air inlet port aligned with the longitudinal airflow and two further separate paths through said separate lateral air inlet ports are provided to each air intake for each engine from the forward direction and both sideways of the helicopter.

According to an advantage of the invention in fast forward flight conditions the inventive HC—with an inlet port pointing in flight direction—can use the RAM effect of forward flight with the frontal inlet port and thus the inventive HC can profit from the dynamic air pressure created by its own forward motion to increase the static air pressure inside of the respective intake manifold for the at least two engines, thus allowing a greater mass flow through the engine and hence increasing engine power. The two lateral air intakes of the two engines introduce additionally air to the engine in hover operations or in slow speed maneuvers. During fast forward flights of the helicopter the two lateral air intakes continue to provide air to the two engines but additionally the frontal air duct supports the two engines with dynamic air pressure and any air pressure and installation losses due to exclusive lateral air intake can be avoided or compensated.

According to a preferred embodiment of the invention air ducts are provided from the at least one frontal air inlet port to the at least two radial air intakes. Said air ducts lead additionally air to the engines, while avoiding any structural obstacles or warm air through heat convection. The air ducts lead the air to the respective engine air intakes while avoiding hot helicopter structures, for example a main gear box or a rotor box.

According to a further preferred embodiment of the invention the at least two air intakes are radial and further preferable twice as large as the at least two radial air intakes of two engines with only two separated lateral air inlet ports.

BRIEF DESCRIPTION OF THE SEVERAL VIEWS OF THE DRAWINGS

Preferred embodiments of the invention are described with reference to the following description and drawings.

FIG. 4 shows a perspective top view of the fuselage of the helicopter with air inlet ports to the engine according to FIG. 3, and FIG. 5 shows a perspective top view of the fuselage of the helicopter with air inlet ports to the engine according to FIG. 3.

DETAILED DESCRIPTION OF THE INVENTION

Figure 1:
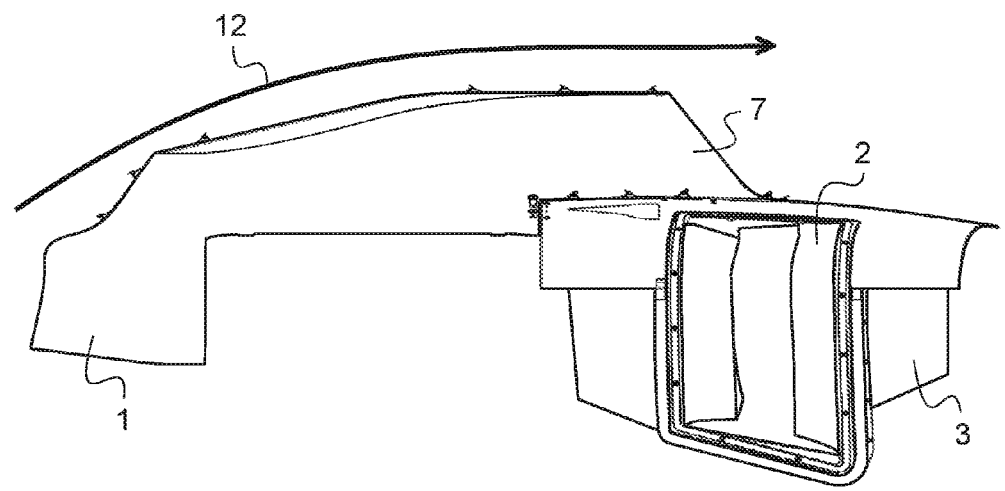
FIG. 1 shows a lateral view of a part of a helicopter with lateral air inlet ports according to the state of the art.

According to FIG. 1 a part of a fuselage 1 with a gear cowling 7 of a helicopter of the state of the art is provided with a lateral air inlet port 2 to one of two engines 3. Said lateral air inlet port 2 is oriented with its cross section substantially parallel to a forward flight direction of the helicopter causing an opposed air flow direction 12. Another lateral air inlet port 2 to the other one of the two engines 3 (not shown) is provided on the fuselage symmetrically relative to a vertical midplane of the helicopter and opposed to the one of the two engines 3.

Figure 2:
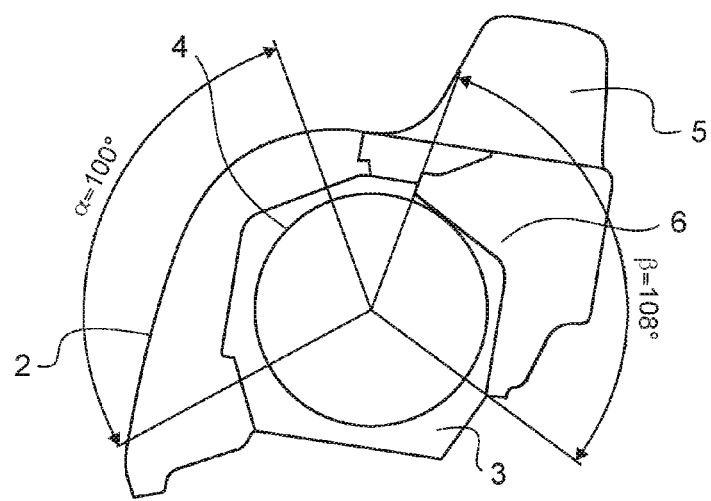
FIG. 2 shows a cross sectional view through a radial air intake of one engine of a helicopter according to the invention.

According to FIG. 2 corresponding features are referred to with the references of FIG. 1. A radial air intake 4 of one engine 3 is supplied with air from the lateral air inlet port 2 through an angular segment $\alpha$ of the circumference of said radial air intake 4, with $\alpha=100°$. The radial air intake 4 of said one engine 3 is further supplied via an air duct 6 with air from a frontal air inlet port 5 through a supplemental angular segment $\beta$ of the circumference of said radial air intake 4, with $\beta=108°$.

Figure 3:
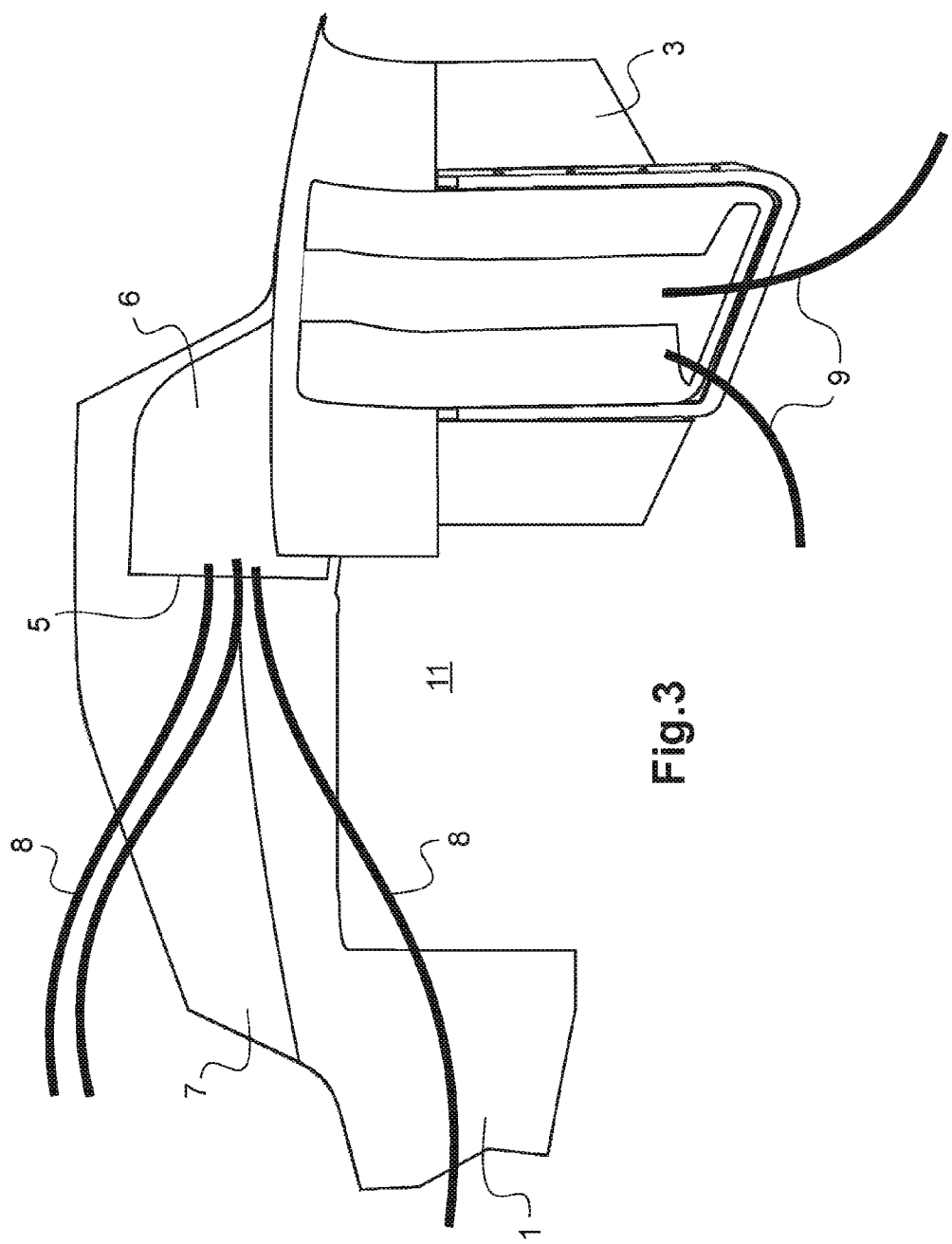
FIG. 3 shows a lateral view of a part of the fuselage of the helicopter with air inlet ports according to the invention.

According to FIG. 3 corresponding features are referred to with the references of FIG. 1, 2. RAM-air 8 is led to the frontal air inlet port 5 on each side of the fuselage 1 along an outside of the fuselage 1 and the gear cowling 7 while avoiding the gear box 11 below the gear cowling 7 and is biased into the respective air ducts 6 on each side of the fuselage 1. Lateral air 9 is supplied to the lateral air inlet port 2 to one of two engines 3. Smooth air ducts 6 of heat resistant composite compound are provided from the frontal air inlet port 5 to the two air intakes 4.

According to FIG. 4 corresponding features are referred to with the references of FIGS. 1-3. The right hand fuselage with its air flow conditions is symmetrical to the left hand fuselage with regard to the midplane of the fuselage 1 of the helicopter, as shown in FIG. 5. The RAM-air 8 of the helicopter in forward flight is led along the fuselage 1 with the gear cowling 7 to the frontal air inlet port 5 via the air duct 6 while avoiding the rotor box 10 of the helicopter. Lateral air 9 is supplied through the lateral air inlet port 2 to the two engines 3.

REFERENCE LIST

1 Fuselage
2 lateral air inlet port
3 engine
4 radial air intake
5 frontal air inlet port
6 air duct
7 gear cowling
8 ram air
9 lateral air
10 rotor box
11 gear box
12 air flow direction

What is claimed is:

1. A helicopter comprising:
    a fuselage having an essentially vertical midplane separating a first lateral side and a second lateral side,
        at least two engines substantially inside the fuselage,
        an air intake for each of the at least two engines,
        at least two separate lateral air inlet ports for the at least two engines in the fuselage, the lateral air inlet ports being arranged on sides opposed to each other relative to an essentially vertical midplane of the fuselage and oriented with their respective cross section substantially parallel to a forward flight direction of the helicopter, a first air duct fluidly coupling one of the lateral air inlet ports with one of the engines on the first lateral side, a second air duct fluidly coupling another of the lateral air inlet ports with another of the engines on the second lateral side, and
    at least one frontal air inlet port with a forward portion being provided separate from the lateral air inlet ports, the at least one frontal air inlet port being located on a gear cowling of the fuselage and being oriented with a cross section of the frontal air inlet port being substantially perpendicular to a forward flight direction, a third air duct fluidly coupling the frontal air inlet port with one of the engines on the first lateral side, a fourth air duct fluidly coupling the frontal air inlet port with another of the engines on the second lateral side,
    whereby a straight path for airflow through the at least one frontal air inlet port aligned with the longitudinal airflow is provided through the third air duct and the fourth air duct to each air intake of the engines, respectively, and two further separate paths through the separate lateral air inlet ports are provided through the first air duct and the second air duct to each air intake of the engines, respectively, wherein the first, second, third and fourth air ducts provide separate and independent airflow pathways to the respective air intakes of the engines such that airflow within each air duct remains separate from airflow within the other air ducts.

2. The helicopter according to claim 1, whereby the air intake for each of the at least two engines is a radial air intake.

3. The helicopter according to claim 2, whereby the at least two radial air intakes are twice as large as compared to at least two radial air intakes of two engines having only two separated lateral air inlet ports for the two engines.

4. The helicopter according to claim 2 whereby the third air duct is configured to direct a first airflow to a first angular segment of the circumference of the radial air intake of the one of the at least two engines; and
    whereby the first air duct is configured to direct a second airflow to a second angular segment of the circumference of the radial air intake of the one of the at least two engines.

5. The helicopter according to claim 4 whereby the first angular segment and the second angular segment are separate from one another.

6. A helicopter comprising:
    a fuselage having a gear cowling;
    a first engine positioned substantially inside the fuselage and having a first air intake;
    a second engine positioned substantially inside the fuselage and having a second air intake;
    first and second lateral air inlet ports for the first and second engines, the first and second lateral air inlet ports being opposed to one another relative to an essentially vertical midplane of the fuselage, each lateral air inlet port being oriented with a respective cross section being substantially parallel to a forward flight direction of the helicopter;
    a frontal air inlet port located on the gear cowling and positioned forward of and separate from the first and second lateral air inlet ports, the frontal air inlet port having a cross section oriented substantially perpendicular to a forward flight direction of the helicopter to provide a straight path for airflow the frontal air inlet port aligned with the longitudinal airflow; and
    whereby the first air intake receives a first airflow via a first air duct fluidly connecting the frontal air inlet port and the first air intake of the first engine on a first lateral side of the essentially vertical midplane of the fuselage and a second airflow via a second air duct fluidly connecting the first lateral air inlet port and the first air intake of the first engine on the first lateral side, the first and second air ducts configured such that once the first and second airflows are in the first and second air ducts, the first airflow within the first air duct remains unmixed with the second airflow within the second air duct prior to reaching the first intake;

whereby the second air intake receives a third airflow via a third air duct fluidly connecting the frontal air inlet port and the second air intake of the second engine on a second lateral side of the essentially vertical midplane of the fuselage and a fourth airflow via a fourth air duct fluidly connecting the second lateral air inlet port and the second air intake of the second engine on the second lateral side, the third and fourth air ducts configured such that once the third and fourth airflows are in the third and fourth air ducts, the third airflow within the third air duct remains unmixed with the fourth airflow within the fourth air duct prior to reaching the second intake; and whereby the first and second air ducts to the first engine are distinct and independent from the third and fourth air ducts to the second engine.

7. The helicopter according to claim 6 whereby the first lateral air inlet port is fluidly connected to only the first intake and first engine via the first air duct; and whereby the second lateral air inlet port is fluidly connected to only the second intake and second engine via the second air duct.

8. The helicopter according to claim 6 whereby the first intake is a first radial intake.

9. The helicopter according to claim 8 whereby the first air duct is configured to direct airflow to a first angular segment of the circumference of the first radial intake; and whereby the second air duct is configured to direct airflow to a second angular segment of the circumference of the first radial intake.

10. The helicopter according to claim 9 whereby the first angular segment and the second angular segment are separate from one another.

11. A helicopter comprising:
a fuselage having a gear cowling;
a first engine positioned substantially inside the fuselage and having a first air intake;
a second engine positioned substantially inside the fuselage and having a second air intake;
a first lateral air inlet port configured to direct airflow to solely the first engine via a first air duct fluidly connecting the first lateral air inlet port and the first air intake on a first lateral side of the fuselage;
a second lateral air inlet port configured to direct airflow to solely the second engine via a second air duct fluidly connecting the second lateral air inlet port and the second intake on a second lateral side of the fuselage; and
a frontal air inlet port configured to direct airflow to at least one of the first and second engines via at least a third air duct fluidly connecting the frontal air inlet port and one of the first and second air intakes on a respective lateral side of the fuselage, the frontal air inlet port located on the gear cowling and positioned forward of and separate from the first and second lateral air inlet ports, the frontal air inlet port being oriented with a cross section of the frontal air inlet port substantially perpendicular to a forward flight direction of the helicopter to provide a straight path for airflow through the frontal air inlet port aligned with the longitudinal airflow;

whereby the first and second lateral air inlet ports are opposed to one another relative to an essentially vertical midplane of the fuselage seoaratina the first and second lateral sides of the fuselage, each lateral air inlet port oriented with respective cross section being substantially parallel to a forward flight direction of the helicopter; and whereby the first air duct, the second air duct, and the third air duct provide independent and separate airflows into the first and second intakes such that airflow within one air duct remains separate from airflow within another air duct.

12. The helicopter according to claim 11 whereby the frontal air inlet port is configured to direct airflow to the first and second engines.

13. The helicopter according to claim 11 whereby the frontal air inlet port is a first frontal air inlet port configured to direct airflow to the first engine; the helicopter further comprising:
a second frontal air inlet port configured to direct airflow to the second engine.

14. The helicopter according to claim 13 whereby the first frontal air inlet port is fluidly coupled to the first intake via the third air duct on the first lateral side of the fuselage; and
whereby the second frontal air inlet port is fluidly coupled to the second intake via fourth air duct on the second lateral side of the fuselage.

15. The helicopter according to claim 14 whereby the third and fourth air ducts are configured to prevent airflow from flowing through a gearbox positioned beneath the gear cowling.

* * * * *